(12) United States Patent
Subramanian et al.

(10) Patent No.: US 10,397,099 B2
(45) Date of Patent: Aug. 27, 2019

(54) SPANNING TREE PROTOCOL ENABLED N-NODE LINK AGGREGATION SYSTEM

(71) Applicant: Dell Products L.P., Round Rock, TX (US)

(72) Inventors: Saye Balasubramaniam Subramanian, Chennai (IN); Senthil Nathan Muthukaruppan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 15/586,088

(22) Filed: May 3, 2017

(65) Prior Publication Data

US 2018/0324089 A1 Nov. 8, 2018

(51) Int. Cl.
*H04L 12/24* (2006.01)
*H04L 12/753* (2013.01)
*H04L 12/709* (2013.01)
*H04L 12/751* (2013.01)
*H04L 12/713* (2013.01)

(52) U.S. Cl.
CPC ............. *H04L 45/48* (2013.01); *H04L 45/02* (2013.01); *H04L 45/245* (2013.01); *H04L 45/586* (2013.01)

(58) Field of Classification Search
CPC ....... H04L 45/48; H04L 45/02; H04L 45/248; H04L 45/586; H04L 61/6022
See application file for complete search history.

(56) References Cited

U.S. PATENT DOCUMENTS

| 2012/0182866 A1* | 7/2012 | Vinayagam | H04L 45/245 370/228 |
| 2013/0170435 A1* | 7/2013 | Dinan | H04L 45/50 370/328 |
| 2014/0362709 A1* | 12/2014 | Kashyap | H04L 41/12 370/250 |

* cited by examiner

*Primary Examiner* — Wei Zhao
(74) *Attorney, Agent, or Firm* — Haynes and Boone, LLP

(57) ABSTRACT

A spanning tree enabled n-node VLT system includes the STP running on VLT node devices that include a first VLT node device coupled to a networking device by a LAG and designated as a root bridge via the STP. A second VLT node device coupled to the networking device is part of the LAG. ICLs couple the second VLT node device to the first VLT node device. An enhanced STP engine running on the each of the VLT node devices determines that the STP has designated a first port providing one of the ICLs as a first root port, and a second port providing one of the ICLs as an alternate port. In response, the enhanced STP engine redesignates the second port as a second root port.

20 Claims, 12 Drawing Sheets

US 10,397,099 B2

SPANNING TREE PROTOCOL ENABLED N-NODE LINK AGGREGATION SYSTEM

BACKGROUND

The present disclosure relates generally to information handling systems, and more particularly to enabling a plurality of link aggregated node devices to run the spanning tree protocol without blocking inter-chassis links between the link aggregated node devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as switches utilize link aggregation to combine multiple network connections in order to increase throughput, provide redundancy, and/or provide a variety of other link aggregation benefits known in the art. For example, some switches utilize Virtual Link Trunking (VLT), which is a proprietary link aggregation protocol that is provided by the Assignee of the present disclosure and that allows for the setup of an aggregated link to a plurality of different switches. VLT is a layer-2 link aggregation protocol that may be utilized by servers and access switches to, for example, provide a redundant load-balanced connection to the core-network in a loop-free environment, provide uplinks between access switches and core switches, and/or provide a variety of other VLT benefits that would be apparent to one of skill in the art. Conventional VLT provides node level and link level resiliency without the use of the conventional spanning tree protocol, as the use of the conventional spanning tree protocol in place of VLT can result in the blocking of at least a portion of an aggregation link between VLT switches, which results in a waste of bandwidth.

However, in some situations, it would be beneficial to block links (as is provided by the conventional spanning tree protocol) to VLT nodes such as the switches discussed above. While VLT nodes generally avoid data loops by forming multi-node link aggregation groups (LAGs), some VLT node configuration can still result in data loops. For example, with reference to the two-node VLT system 200 of FIG. 2, a pair of VLT node devices 202 and 204 may be connected to each other by an Inter-Chassis Link (ICL) 206, and may each be part of a VLT LAG 208 to a Top Of Rack (TOR) switch device 210 that is also connected to the VLT node device 202 by a link 212. In another example, with reference to the two-node VLT system 300 of FIG. 3, a pair of VLT node devices 302 and 304 may be connected to each other by an ICL 306, and may each be part of a first VLT LAG 308 to a TOR switch device 310, as well as part of a second VLT LAG 312 to a TOR switch device 314 that is also connected to the TOR switch 310 by a link 316. One of skill in the art in possession of the present disclosure will recognize how the configurations of the two-node VLT systems 200 and 300, as well as the n-node VLT system discussed below with reference to FIG. 4, may result in data loops (e.g., via a data loop provided by the ICL 206, the VLT LAG 208, and the link 210 in FIG. 2.)

N-node VLT systems can support any arbitrary topology (e.g., star topologies, ring topologies, mesh topologies, etc.) for a VLT fabric that includes VLT nodes connected by ICLs. In such n-node VLT systems, a VLT fabric manager may run an ICL loop prevention algorithm and install any appropriate forwarding rules to break loops in the VLT fabric without blocking any of the ICLs between the VLT nodes. However, if the conventional spanning tree protocol is run on such an n-node VLT system, it may operate to block ICLs between VLT nodes. Furthermore, the conventional spanning tree protocol may also block ICLs between the VLT nodes even when there is no data loop in the VLT fabric (i.e., in the VLT nodes connected by ICLs), as if the ICL is part of a data loop (e.g., the ICL 206 that is part of a data loop that includes the VLT lag 208 and the link 210 in FIG. 2), the conventional spanning tree protocol may operate to block that ICL to avoid the data loop. Furthermore, VLT LAGs can be provided for all the VLT nodes in the VLT fabric, or for only a subset of the VLT nodes in the VLT fabric, and the conventional spanning tree protocol would need to run on all of the VLT nodes in the VLT fabric, with the conventional spanning tree protocol port state for the VLT LAG consistent across all of the VLT nodes in the VLT fabric, and the conventional spanning tree protocol using the same port identifier for control messages (e.g., Bridging Protocol Data Units (BDPUs)) sent to all the VLT nodes that are part of a VLT LAG. Solving these and other issues would enable the use of the spanning tree protocol to block links in an n-node VLT system in order to address data loops that arise in some VLT node configurations.

Accordingly, it would be desirable to provide a spanning tree enabled n-node link aggregation system.

SUMMARY

According to one embodiment, an Information Handling System (IHS) includes a plurality of Inter-Chassis Links (ICLs) that are provided between a plurality of ICL ports and that couple to a first of a plurality of link aggregation node devices that has been designated as a root bridge by the spanning tree protocol running on each of the plurality of link aggregation node devices; a Link Aggregation Group (LAG) that includes a plurality of LAG ports and that is coupled to a networking device; a processing system that is coupled to the plurality of ICL ports and the plurality of LAG ports, and a memory system that is coupled to the processing system and that includes instructions that, when executed by the processing system, cause the processing system to provide an enhanced spanning tree protocol engine that is configured to: determine that a first ICL port of the plurality of ICL ports has been designated as a first root port via the spanning tree protocol; determine that a second ICL port of the plurality of ICL ports has been designated as an alternate port via the spanning tree protocol; and redesignate, in response to the first ICL port being designated as the first root port and the second ICL port being designated as the alternate port, the second port as a second root port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
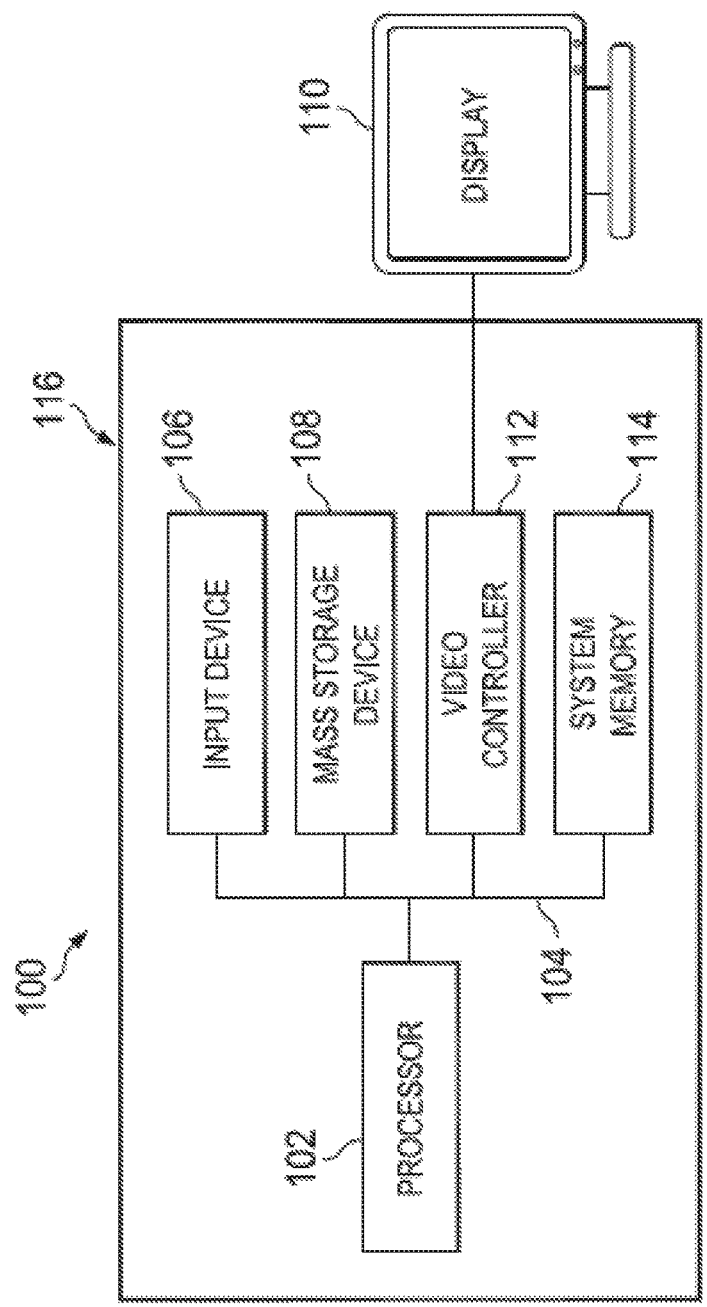
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 4:
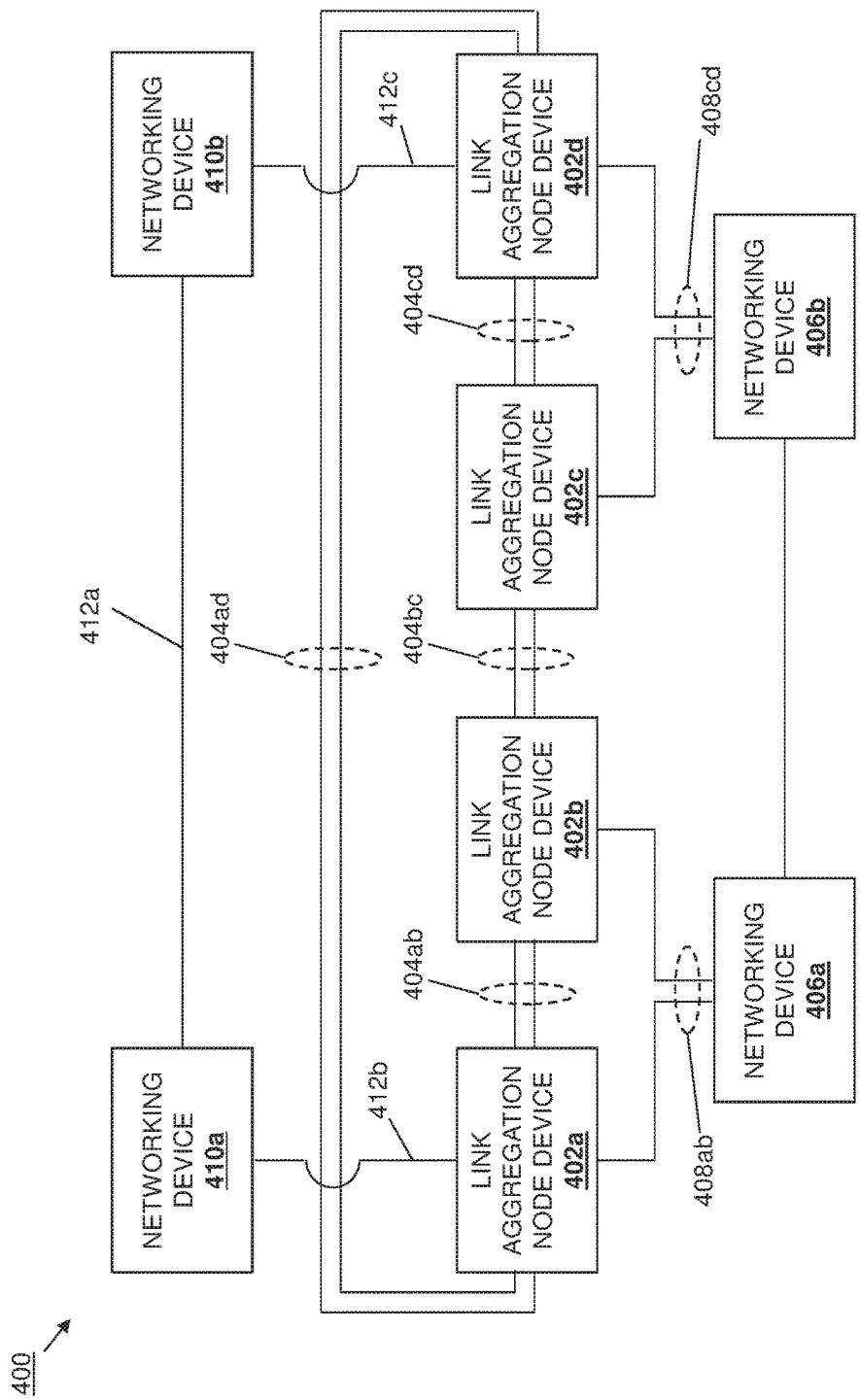
FIG. 4 is a schematic view of an embodiment of an n-node link aggregation system.

Referring now to FIG. 4, an embodiment of a spanning tree enabled n-node link aggregation system 400 is illustrated. In the embodiments discussed below, the spanning tree enabled n-node link aggregation system 400 utilizes Virtual Link Trunking (VLT), a proprietary link aggregation protocol available in devices provided by Dell, Inc. of Round Rock, Tex., United States, as the link aggregation protocol discussed below. However, one of skill in the art in possession of the present disclosure will recognize that other link aggregated systems using other link aggregation protocols may be enabled with the spanning tree protocol using the teachings of the present disclosure and thus will fall within its scope. In an embodiment, the spanning tree enabled n-node link aggregation system 400 includes a link aggregation fabric (e.g., a VLT fabric) having a plurality of link aggregation node devices 402a, 402b, 402c, and 402d that are connected together by Inter-Chassis Links (ICLs) 404 that each include one or more links between ports on the link aggregation node devices 402a-d.

While FIG. 4 illustrates a particular link aggregation fabric, one of skill in the art in possession of the present disclosure will recognize that link aggregation fabrics may be provided in star configuration, ring configurations, mesh configurations, and/or a variety of other configurations known in the art. In the illustrated embodiment, the ICLs 404 are identified in FIG. 4 by their connected link aggregation node devices using the notation 404xy, where x and y designate the letter associated with their corresponding link aggregation node device. As such, the ICL 404ab is provided between link aggregation node devices 402a and 402b, the ICL 404bc is provided between the link aggregation node devices 402b and 402c, and so on. While only four link aggregation node devices are illustrated in FIG. 4, one of skill in the art in possession of the present disclosure will recognize that any number of link aggregation node devices (i.e., "N nodes") may be provided in a link aggregation fabric while remaining within the scope of the present disclosure.

Figure 2:
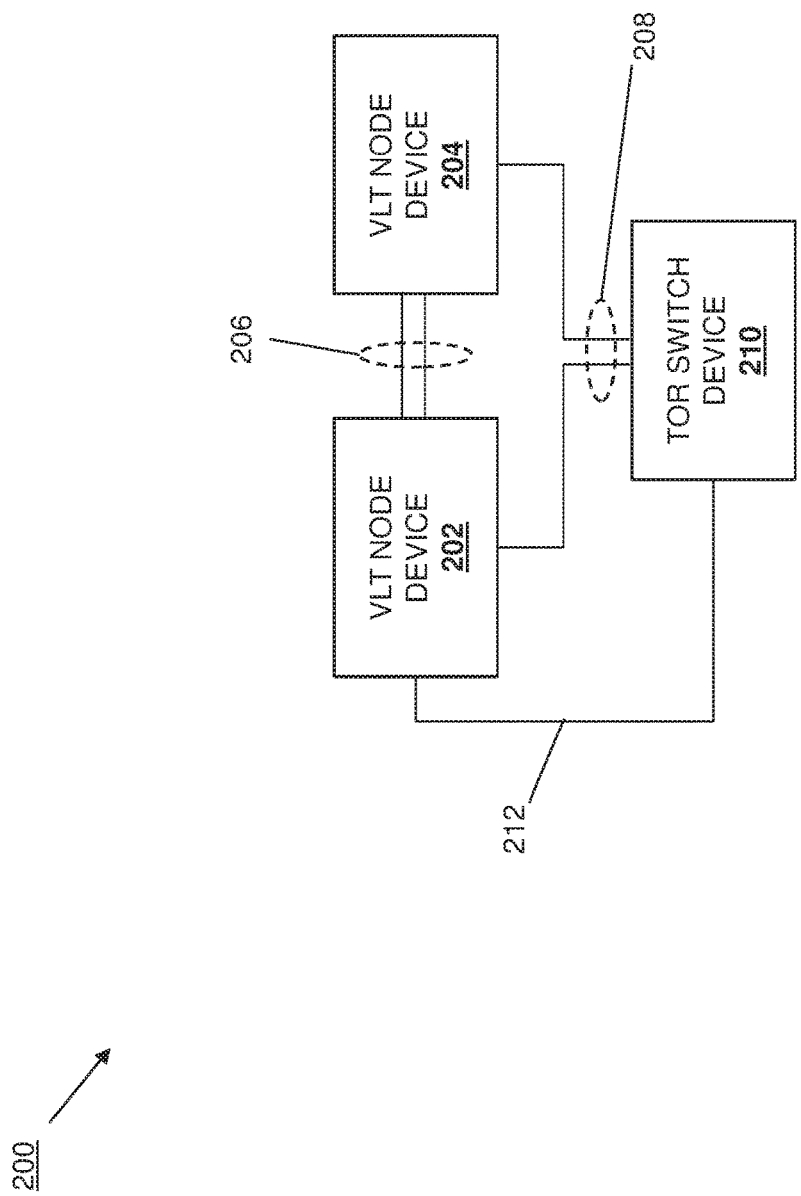
FIG. 2 is a schematic view of an embodiment of a two-node VLT system.
Figure 3:
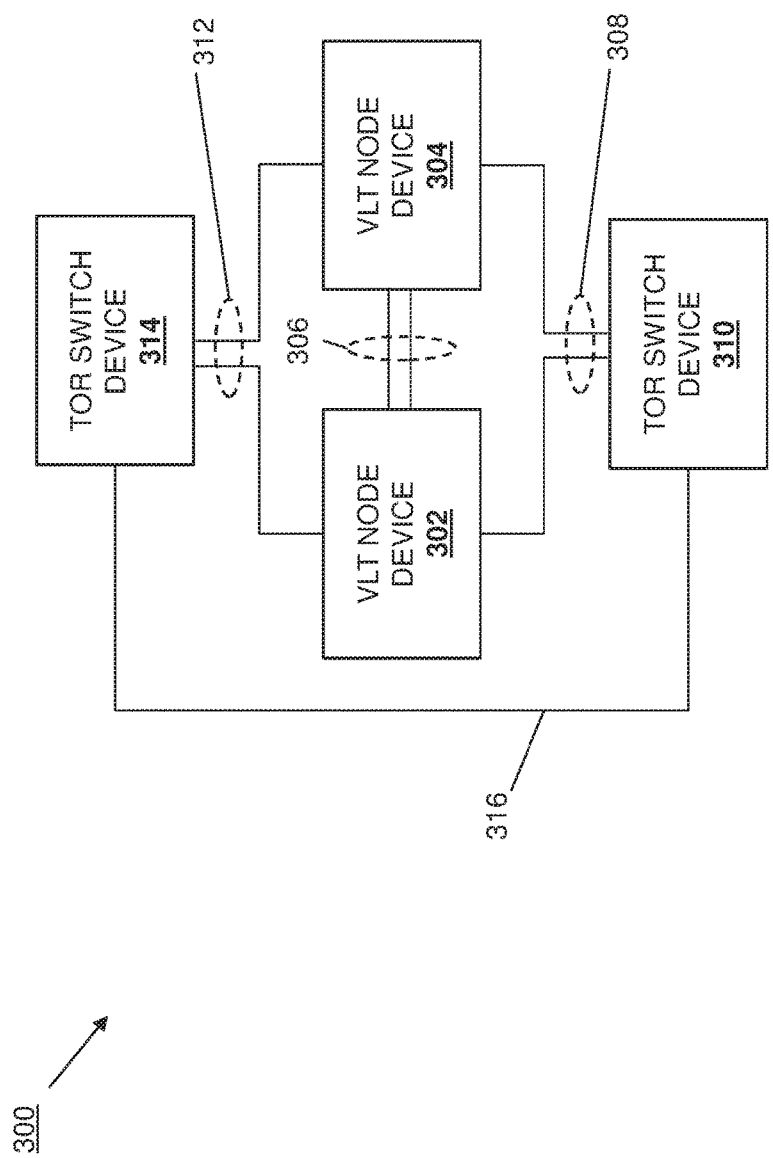
FIG. 3 is a schematic view of an embodiment of a two-node VLT system.

In an embodiment, each of the link aggregation node devices 402a-d may be provided by the IHS 100 of FIG. 1 and/or may include some or all of the components of the IHS 100. In a specific embodiment, the link aggregation node devices 402*a-d* may be switches, although providing other types of computing devices as the link aggregation node devices 402*a-d* may fall within the scope of the present disclosure as well. In some embodiments, the link aggregation node devices 404*a-d* are VLT nodes similar to the VLT node devices 202, 204 of FIG. 2 and the VLT node devices 302, 304 of FIG. 3, with the ICLs 404*ab*, 404*bc*, 404*cd*, and 404*ad* similar to the ICL 206 of FIG. 2 and the ICL 306 of FIG. 3. However, one of skill in the art in possession of the present disclosure will recognize that other link aggregated systems utilizing other types of link aggregated node devices connected by ICLs may be enabled with the spanning tree protocol using the teachings of the present disclosure and thus will fall within its scope.

In an embodiment, the spanning tree enabled n-node link aggregation system 400 includes networking devices 406*a* and 406*b* that are each coupled to subsets of the link aggregation node devices 402*a-d* by a plurality of links that have been provided in Link Aggregation Groups (LAGs) 408. In the illustrated embodiment, the LAGs 408 are identified in FIG. 4 by their connected link aggregation node devices using the notation 408*xy*, where x and y designate the letter associated with their corresponding link aggregation node device. As such, the LAG 408*ab* is provided for the links between the networking device 406*a* and each of the link aggregation nodes 402*a* and 402*b*, and the LAG 408*cd* is provided for the links between the networking device 406*b* and each of the link aggregation nodes 402*c* and 402*d*. In an embodiment, each of the networking devices 406*a* and 406*b* may be provided by the IHS 100 of FIG. 1 and/or may include some or all of the components of the IHS 100. In a specific embodiment, the networking devices 406*a* and 406*b* may be switches, although providing other types of computing devices (e.g., server devices) as the networking devices 406*a* and 406*b* may fall within the scope of the present disclosure as well. In some embodiments, the networking devices 406*a* and 406*b* may be TOR switch devices similar to the TOR switch device of FIG. 2 and the TOR switch devices 310 and 314 of FIG. 3, with the LAGs 408*ab* and 408*cd* similar to the LAG 208 of FIG. 2 and the LAGs 308 and 312 of FIG. 3. However, one of skill in the art in possession of the present disclosure will recognize that other link aggregated systems utilizing other networking devices connected to link aggregation node devices by LAGs may be enabled with the spanning tree protocol using the teachings of the present disclosure and thus will fall within its scope.

In the illustrated embodiment, the spanning tree enabled n-node link aggregation system 400 also includes networking devices 410*a* and 410*b* that are coupled together by a link 412*a*, with the networking device 410*a* coupled to the link aggregation node device 402*a* by a link 412*b*, and the networking device 410*b* coupled to the link aggregation node device 402*d* by a link 412*c*. In an embodiment, each of the networking devices 410*a* and 410*b* may be provided by the IHS 100 of FIG. 1 and/or may include some or all of the components of the IHS 100. In a specific embodiment, the networking devices 410*a* and 410*b* may be layer 2 switches, although providing other types of computing devices as the networking devices 410*a* and 410*b* may fall within the scope of the present disclosure as well. While a specific spanning tree enabled n-node link aggregation system 400 has been illustrated and described, one of skill in the art in possession of the present disclosure will recognize that other devices and device configurations may be provided for the spanning tree enabled n-node link aggregation system of the present disclosure while remaining within its scope. For example, each of the two-node VLT systems 200 and 300 of FIGS. 2 and 3 will benefit from the teachings of the present disclosure, and thus a wide variety of modification may be made to spanning tree enabled n-node link aggregation systems described herein while remaining within the scope of the present disclosure as well.

Figure 5:
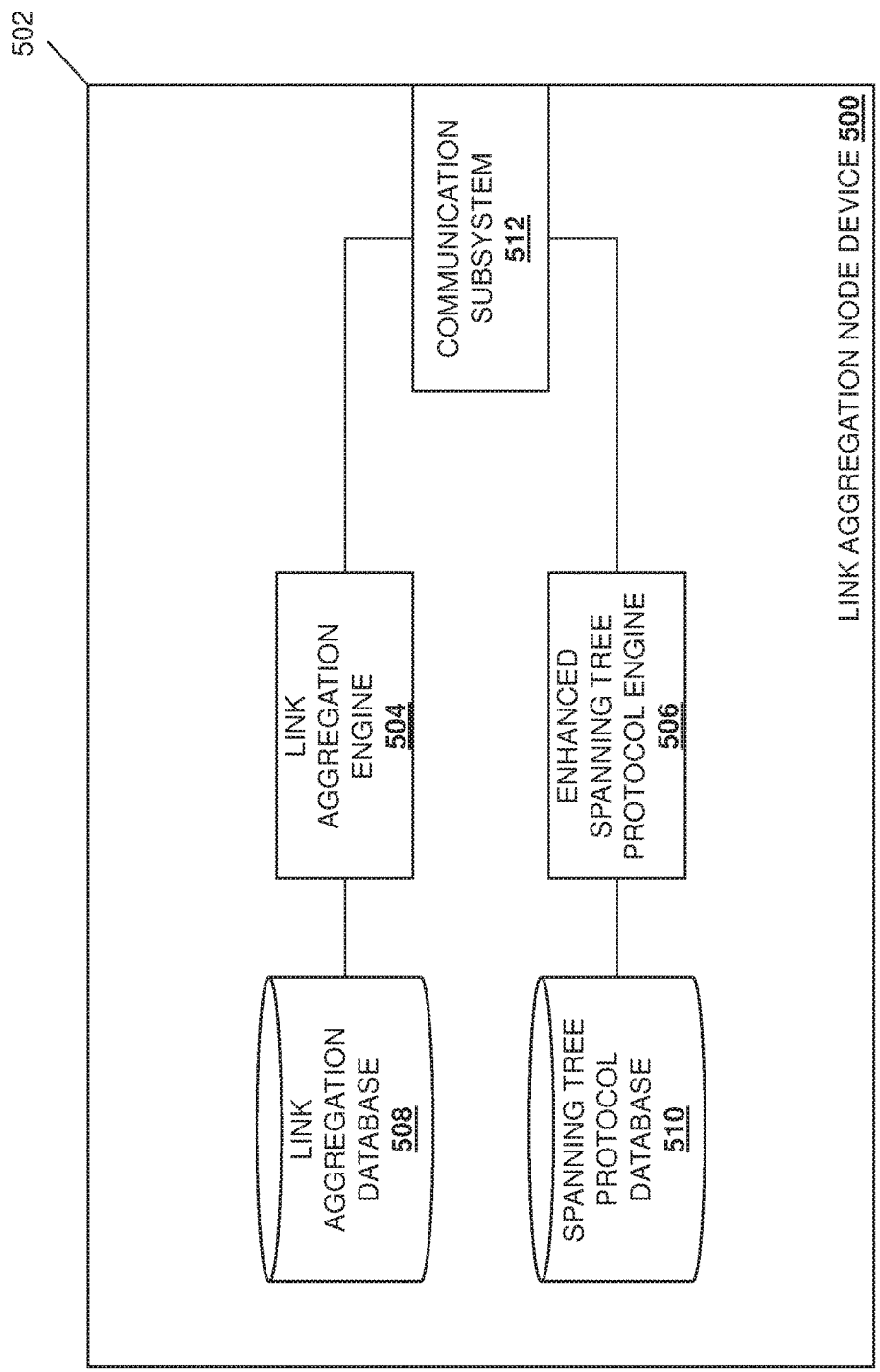
FIG. 5 is a schematic view illustrating an embodiment of a link aggregation node device used in the n-node link aggregation system of FIG. 3.

Referring now to FIG. 5, an embodiment of a link aggregation node device 500 is illustrated that may be any of the link aggregation node devices 402*a-d* discussed above with reference to FIG. 4. As such, the link aggregation node device 500 may be provided by the IHS 100 of FIG. 1 and/or may include some or all of the components of the IHS 100, and in specific embodiments may be a VLT node such as a switch. In the illustrated embodiment, the link aggregation node device 500 includes a chassis 502 that houses the components of the link aggregation node device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a link aggregation engine 504 and an enhanced spanning tree protocol engine 506 that are configured to perform the functions of the link aggregation engines, enhanced spanning tree protocol engines, and link aggregation node devices discussed below. In some embodiments, the link aggregation engine 504 may be a VLT engine that is configured to perform VLT operations. However, one of skill in the art in possession of the present disclosure will recognize that other link aggregation engines that perform other link aggregation protocols may fall within the scope of the present disclosure as well.

The chassis 502 may also house a storage system (not illustrated, but which may include the storage device 108 discussed above with reference to FIG. 1) that is coupled to the link aggregation engine 504 and the enhanced spanning tree protocol engine 506 (e.g., via a coupling between the storage system and the processing system) and that includes a link aggregation database 508 and a spanning tree protocol database 510 that store data for performing the functionality discussed below. The chassis 502 may also house a communication subsystem 512 that is coupled to the link aggregation engine 504 and the enhanced spanning tree protocol engine 506 (e.g., via a coupling between the communication subsystem and the processing system) and that may include a Network Interface Controller (NIC), a wireless communication device (e.g., a BLUETOOTH® communication device, a Near Field Communication (NFC) device, and/or other wireless communications devices known in the art), and/or other communication components known in the art. As such, the communication subsystem may include the ports utilized to provide the links, LAGs, ICLs, and/or other communication connections discussed above with reference to FIG. 4. While a specific embodiment of a link aggregation node device 500 is illustrated and described, one of skill in the art in possession of the present disclosure will recognize that other components may be included in the link aggregation node device 500 to provide conventional link aggregation node device functionality (e.g., switching functionality), as well as the functionality discussed below, while remaining within the scope of the present disclosure.

With reference to FIGS. 4 and 5, in the embodiment of the method 600 described below, the conventional spanning tree protocol (STP) is provided on each of the plurality of link aggregation nodes 402a-d, and the enhanced spanning tree protocol engine 506 in each link aggregation node 402a-d/500 enables the use of the conventional spanning tree protocol in the spanning tree enabled n-node link aggregation system 400 without introducing the problems discussed above. However, this embodiment is described in an attempt to provide a clear understanding of the teachings of the present disclosure, and one of skill in the art in possession of the present disclosure will recognize that the functionality of the conventional spanning tree protocol and the enhanced spanning tree protocol engine 506 may be combined into a single engine (e.g., a spanning tree protocol engine) that performs the functionality described below while remaining within the scope of the present disclosure. Furthermore, one of skill in the art in possession of the present disclosure will recognize that some or all of the functionality of the conventional spanning tree protocol, the link aggregation engine 504, and the enhanced spanning tree protocol engine 506 may be provided on other devices in the spanning tree enabled n-node link aggregation system 400. For example, the conventional spanning tree protocol, the link aggregation engine 504, and/or the enhanced spanning tree protocol engine 506 may be provided on the networking devices 406a, 406b, 410a, and/or 410b of FIG. 4 while remaining within the scope of the present disclosure.

Figure 6:
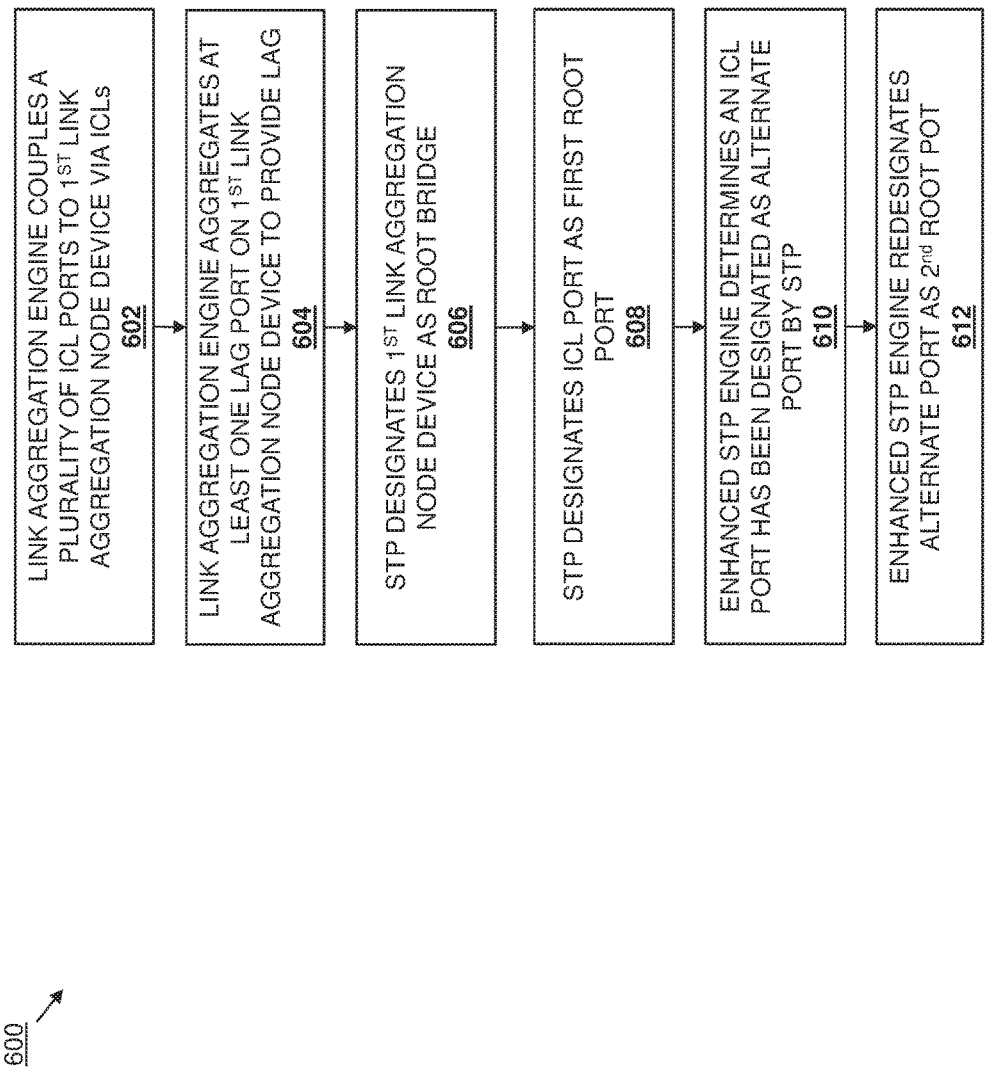
FIG. 6 is a flow chart illustrating an embodiment of a method for enabling the spanning tree protocol in an n-node link aggregation system.

Referring now to FIG. 6, an embodiment of a method 600 for enabling the spanning tree protocol in an n-node link aggregation system is illustrated. As discussed below, the systems and methods of the present disclosure provides a modified spanning tree protocol that can provide multiple root ports for a link aggregation node that provide for communications with a link aggregation node that has been designated as a root bridge using the spanning tree protocol. As discussed below, the provisioning of multiple root ports for a link aggregation node in a link aggregation fabric that includes a link aggregation node designated as a root bridge provides a spanning tree that converges well and prevents loops, while operating to prevent the blocking of ICLs between the link aggregation nodes in the link aggregation fabric, and allowing a link aggregation fabric manager to control traffic in the link aggregation fabric. As discussed further below, other functionality may be employed to enable the use of the spanning tree protocol in link aggregation fabrics including, for example, the prevention of Media Access Control (MAC) address flushing on ports that are part of an ICL, the blocking of the transmission of topology change notifications on ports that have been designated as alternate ports by the spanning tree protocol, the awareness of LAGs by the spanning tree protocol running on each of the link aggregation node devices, the creation of a virtual port in a link aggregation nodes for a LAG when that link aggregation node does not include a local port-channel for that LAG, and the use of those virtual ports to send control messages. As such, one of skill in the art in possession of the present disclosure will recognize how the teachings provided herein may be utilized to provide a spanning tree enabled n-node link aggregation system (e.g., a VLT system that utilizes a modified spanning tree protocol to block data loops without blocking ICLs) for any of a variety of n-node link aggregation systems.

The method 600 begins at block 602 where a link aggregation engine couples a plurality of Inter-Chassis Link (ICL) ports to a first link aggregation node device via an ICL. In an embodiment, at block 602, a link aggregation fabric manager (e.g., a VLT fabric manager) provided in the link aggregation node devices may operate according to link aggregation protocols (e.g., the VLT protocol) to create a plurality of ICLs to a link aggregation node device in a link aggregation fabric. For example, with reference to FIG. 4, the link aggregation fabric manager may cause the link aggregation engines 504 provided in the link aggregation node devices 402a-d to operate to cause the ICLs 404ab, 404bc, 404cd, and 404ad, discussed above, to be created. The details of the creation of ICLs in link aggregation fabrics (e.g., the creation of ICLs in VLT fabrics according to the VLT protocol) are known in the art and will not be discussed herein in detail. For reference to the example provided below, following block 602, at least one ICL port on the link aggregation node devices 402a-d is part of the ICLs 404ab, 404bc, 404cd, and 404ad.

The method 600 then proceeds to block 604 where the link aggregation engine aggregates at least one Link Aggregation Group (LAG) port on the first link aggregation node device to provide a LAG. In an embodiment, at block 606, the link aggregation fabric manager (e.g., the VLT fabric manager) may operate according to link aggregation protocols (e.g., the VLT protocol) to create LAGs between at least one networking device and a plurality of link aggregation node devices. For example, with reference to FIG. 4, the link aggregation fabric manager may cause the link aggregation engines 504 provided in the link aggregation node devices 402a-d and/or the networking devices 406a-b to operate to cause the LAGs 408ab and 408cd, discussed above, to be created. The details of the creation of LAGs in link aggregation fabrics (e.g., VLT LAGS in VLT fabrics according to the VLT protocol) are known in the art and will not be discussed herein in detail. For reference to the example provided below, following block 604, at least one LAG port on the link aggregation node device 402a is part of the LAG 408ab that connects the networking device 406a to the link aggregation node devices 402a and 402b. One of skill in the art in possession of the present disclosure will recognize how the LAGs 408ab and 408cd will include LAG ports on the link aggregation node devices 402b-d that are part of LAGs in a similar manner.

Furthermore, while the method 600 details the creation of the ICLs and LAGs in the link aggregation fabric, other features of the link aggregation fabric (e.g., a VLT fabric) may be created prior to or during the method 600, and other link aggregation operations may be performed, while remaining within the scope of the present disclosure. For example, the link aggregation fabric manager (e.g., a VLT fabric manager) may perform an ICL loop prevention algorithm to generate a variety of forwarding rules that are configured to break loops in the link aggregation fabric (e.g., a VLT fabric), and provide those forwarding rules to the link aggregation node devices 402a-d. However, as discussed above, if the conventional spanning tree protocol were to then be provided on that link aggregation fabric, it will operate to block redundant ICLs, even if there is no loop in the link aggregation fabric (i.e., when a redundant ICL Is part of a data loop that extends outside of the link aggregation fabric). As such, in order to provide the spanning tree protocol in the link aggregation fabric, enhancements to the spanning tree protocol, discussed below, are performed during the method 600 in order to prevent those and the other issues discussed above from occurring.

The method then proceeds to block 606 where the spanning tree protocol is used to designate a first link aggregation node as a root bridge. In some embodiments, prior to the method 600, the spanning tree protocol may be provided on each of the link aggregation node devices in the link aggregation fabric, as well as devices coupled to the link aggregation fabric. In a specific example, a single instance of the spanning tree protocol may be provided on the link aggregation node devices in the link aggregation fabric, as well as some or all of the networking devices coupled to the link aggregation fabric, according to the Institute of Electrical and Electronics Engineers (IEEE) 802.1q specification that defines a common spanning tree that provides one spanning tree instance for the entire fabric. However, in other examples, more than one instance of the spanning tree protocol may be provided on the link aggregation node devices in the link aggregation fabric. With reference to FIG. 4, during or prior to the method 600, the spanning tree protocol may be provided on any or all of the link aggregation node devices 402a-d, the networking devices 406a-b, and/or the networking devices 410a-b.

As discussed above, the spanning tree protocol that is provided in the spanning tree enabled n-node link aggregation system 400 may be provided by a spanning tree protocol engine in each of the devices in the spanning tree enabled n-node link aggregation system 400 (e.g., similar to, or combined with, the enhanced spanning tree protocol engine 506 discussed above with reference to FIG. 5). At block 606, spanning tree protocol provided in the spanning tree enabled n-node link aggregation system 400 operates to designate one of the link aggregation node devices 402a-d as a root bridge. In an embodiment, the designation of one of the link aggregation node devices 402a-d (e.g., VLT nodes) as the root bridge may be in response to that link aggregation node (e.g., a VLT node) being the highest priority link aggregation node (e.g., the highest priority VLT node/VLT switch) in the link aggregation fabric (e.g., the VLT fabric.)

For example, as would be understood by one of skill in the art in possession of the present disclosure, a user or network administrator may configure node devices in the fabric with "best" bridge priorities, and following the exchange of Bridging Protocol Data Units (BDPUs) between the node devices, the node device with the highest priority (i.e., the "best" bridge in the topology) will be designated as the root bridge. However, the specific details of the designation of a root bridge according to the spanning tree protocol are known in the art and will not be discussed herein in detail. As such, at or before block 606, the user or network administrator will designate one of the link aggregation node devices 402a-d as the node device with the highest priority, which will cause the spanning tree protocol to designate that link aggregation node device as the root bridge. In the examples below, the link aggregation node device 402a is designated as the root bridge by the spanning tree protocol provided in the spanning tree enabled n-node link aggregation system 400, but one of skill in the art will recognize that any of the link aggregation node devices 402a-d may be designated as the root bridge at block 602 (i.e., based on the prioritization of that link aggregation node device by the user/network administrator) while remaining within the scope of the present disclosure.

The method 600 then proceeds to block 608 where the spanning tree protocol engine designates an ICL port as a first root port. In some embodiments, at or prior to decision block 608, the spanning tree protocol provided in the spanning tree enabled n-node link aggregation system 400 may operate to designate a port on a link aggregation node device that is part of an ICL (i.e., an "ICL port") as a root port (referred to below as a "first root port" to distinguish it from a "second root port" that may be designated according to some blocks of the method 600). As would be understood by one of skill in the art in possession of the present disclosure, a port may be designated a root port by the spanning tree protocol SEM when that port is determined to provide a desired link (e.g., the "best" link) to a root bridge. The details of the designation of a root port according to the spanning tree protocol are known in the art and will not be discussed herein in detail.

Figure 7:
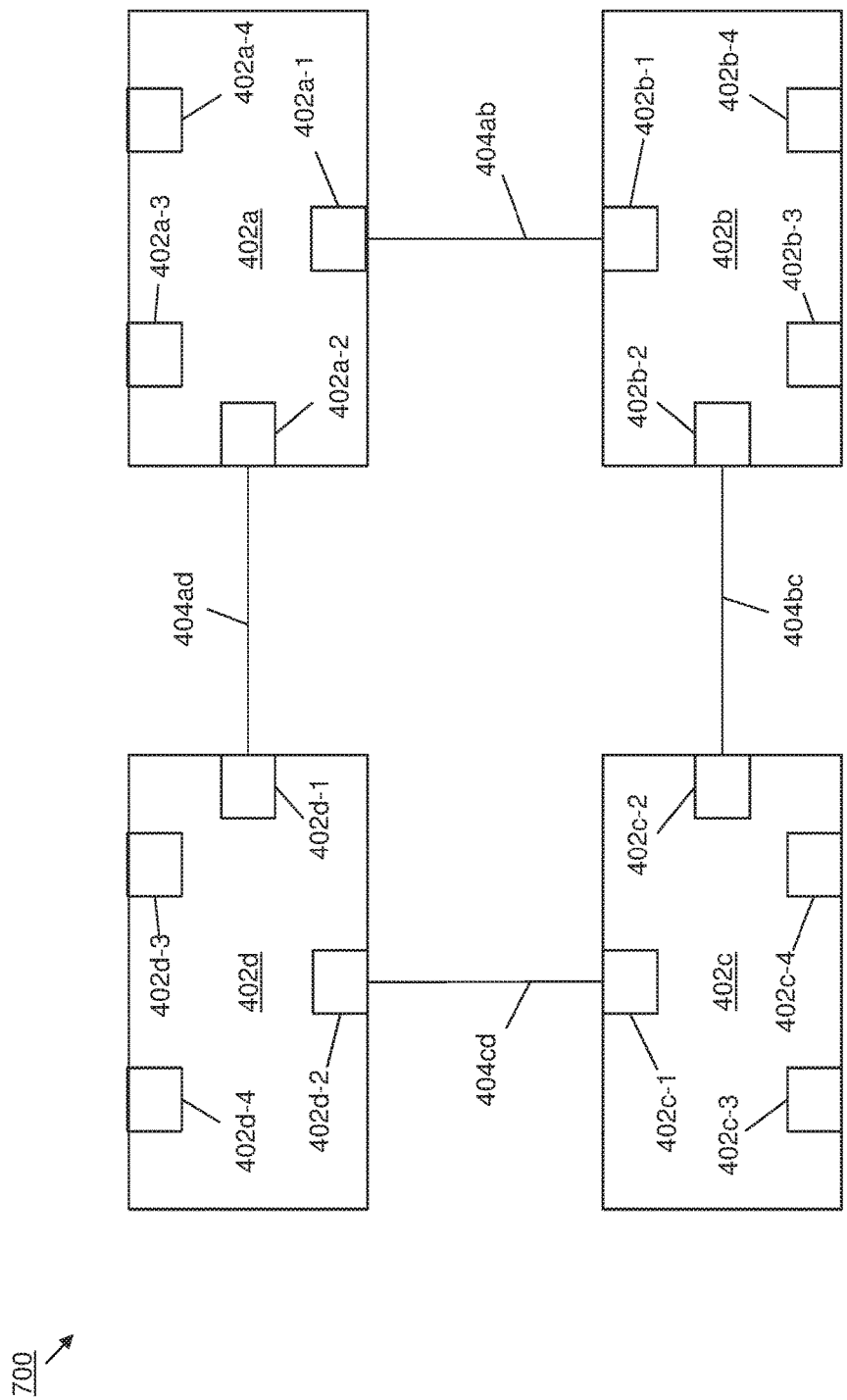
FIG. 7 is a schematic view illustrating an embodiment of a link aggregation fabric diagram that includes a plurality of link aggregation node devices in the n-node link aggregation system of FIG. 3.

Referring now to FIG. 7, a link aggregation fabric diagram 700 is provided to illustrate the port designations discussed below. The link aggregation fabric diagram includes the plurality of link aggregation node devices 402a-d connected by the ICLs 404ab, 404bc, 404cd, and 404ad, discussed above with reference to FIG. 4. In addition, port identifiers on each of the link aggregation node devices 402a-d are illustrated, with the link aggregation node device 402a including a port identifier 402a-1 for the ICL 404ab in the link aggregation node device 402a, a port identifier 402a-2 for the ICL 404ad in the link aggregation node device 402a, and port identifiers 402a-3 and 402a-4 for non-ICL links in the link aggregation node device 402a. Similarly, the link aggregation node device 402b includes a port identifier 402b-1 for the ICL 404ab in the link aggregation node device 402b, a port identifier 402b-2 for the ICL 404bc in the link aggregation node device 402b, and port identifiers 402b-3 and 402b-4 for non-ICL links in the link aggregation node device 402b; the link aggregation node device 402c includes a port identifier 402c-1 for the ICL 404cd in the link aggregation node device 402c, a port identifier 402c-2 for the ICL 404bc in the link aggregation node device 402c, and port identifiers 402c-3 and 402c-4 for non-ICL links in the link aggregation node device 402c; and the link aggregation node device 402d includes a port identifier 402d-1 for the ICL 404ad in the link aggregation node device 402d, a port identifier 402d-2 for the ICL 404cd in the link aggregation node device 402d, and port identifiers 402d-3 and 402d-4 for non-ICL links in the link aggregation node device 402d.

Figure 8A:
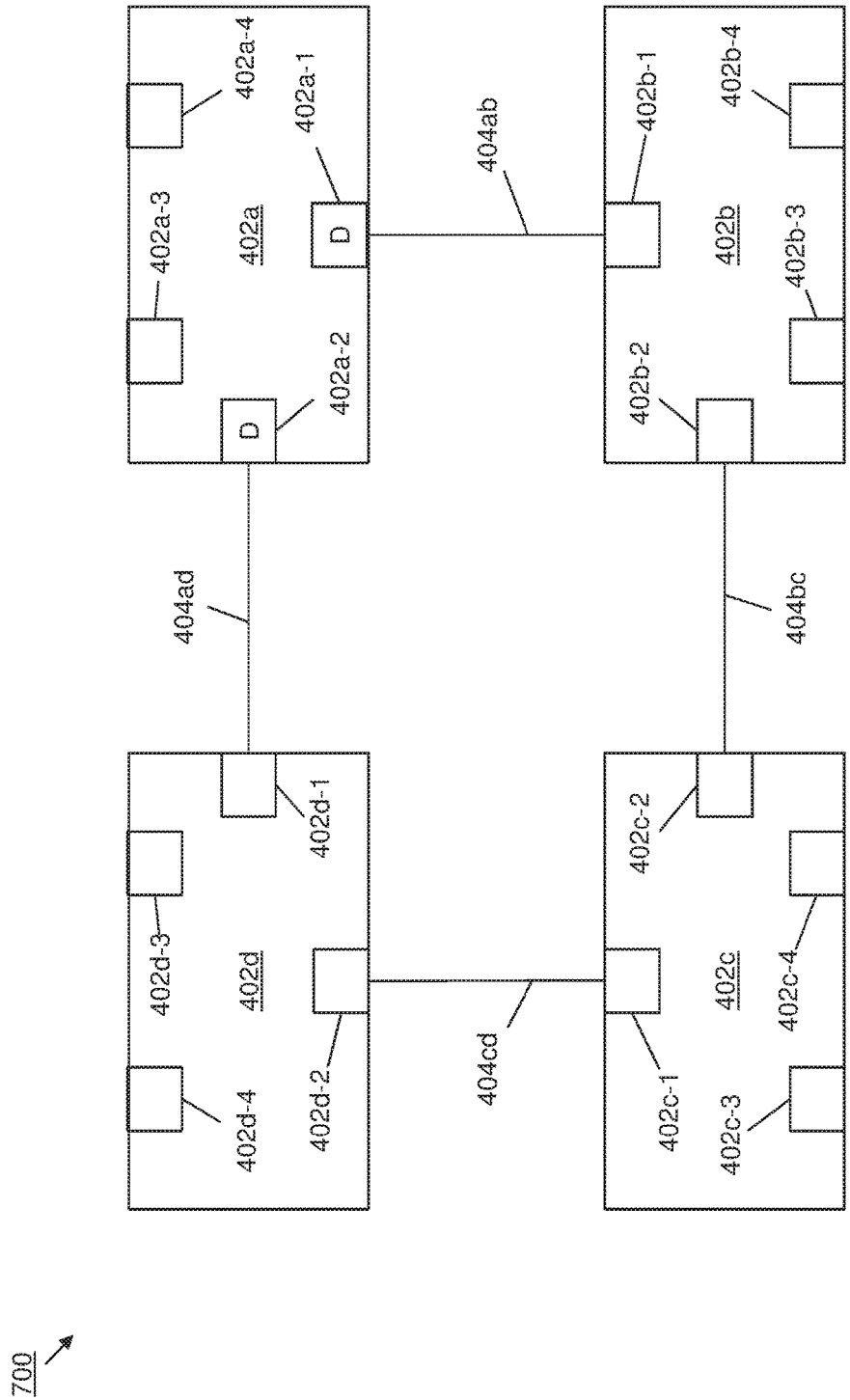
FIG. 8a is a schematic view illustrating an embodiment of the link aggregation fabric diagram of FIG. 7 with port assignments.
Figure 8B:
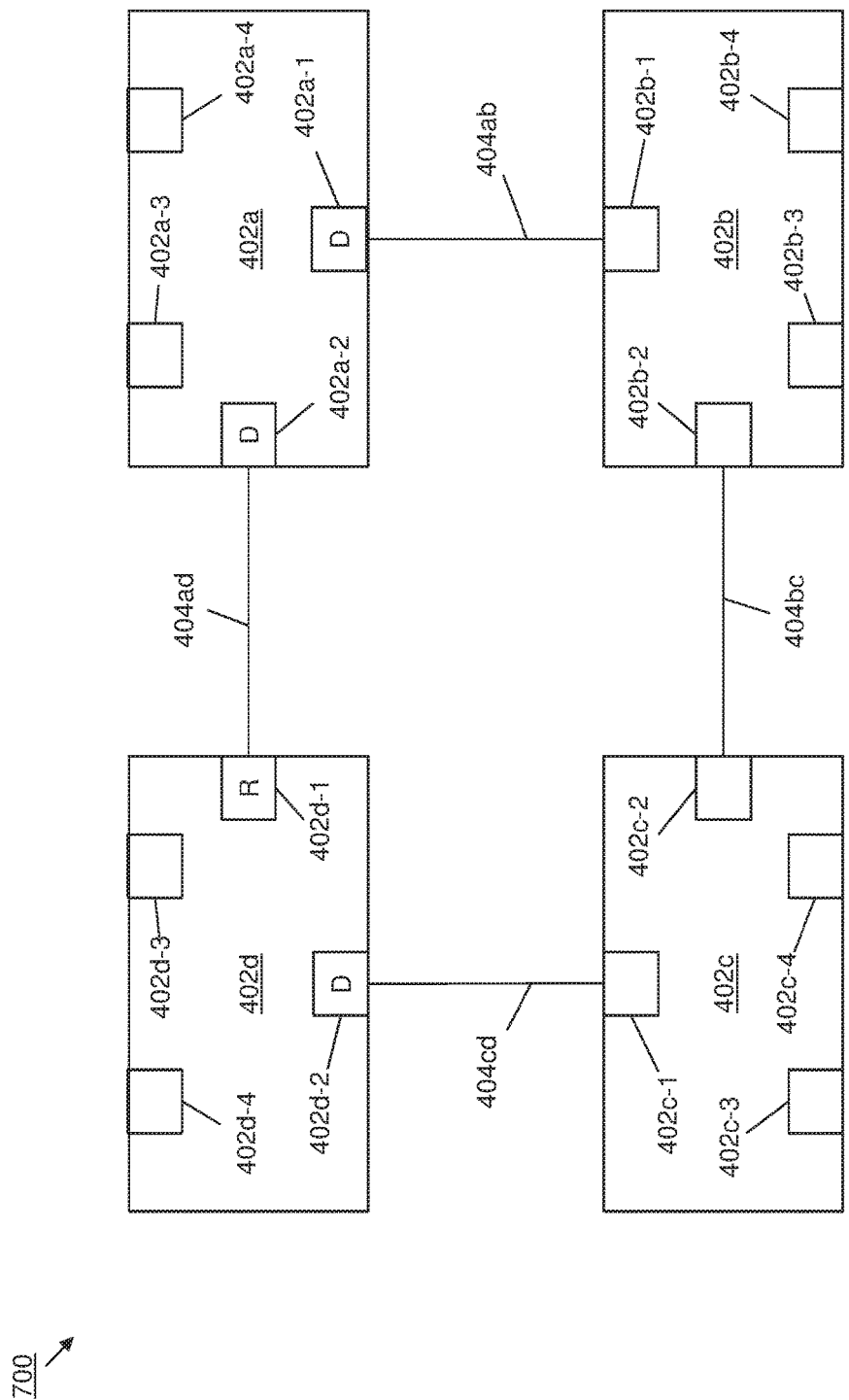
FIG. 8b is a schematic view illustrating an embodiment of the link aggregation fabric diagram of FIG. 7 with port assignments.
Figure 8C:
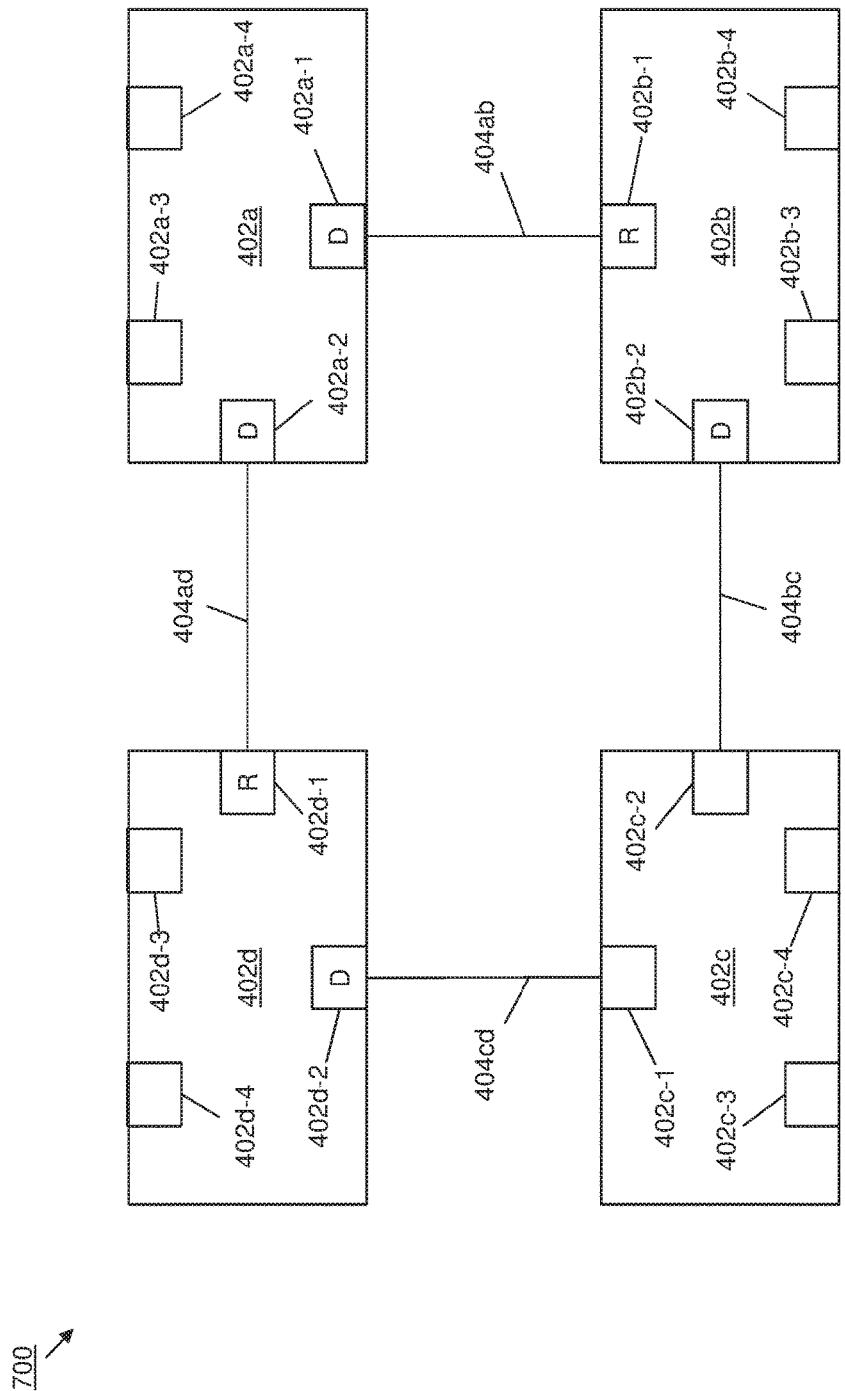
FIG. 8c is a schematic view illustrating an embodiment of the link aggregation fabric diagram of FIG. 7 with port assignments.

In an embodiment, at or prior to block 308, the spanning tree protocol may operate to designate the port identifiers 402a-1 and 402a-2 on the link aggregation node device 402a as designated ports D, as illustrated in FIG. 8a with the "D" provided for each port identifier 402a-1 and 402a-2. Following that designation, the link aggregation node device 402a may operate to send BPDUs (through its ports) that include root bridge information about the link aggregation node device 402a (which was designated as the root bridge as discussed above). As such, the link aggregation node device 402d may receive a BDPU from the link aggregation node device 402a via its port associated with the port identifier 402d-1, and because the root bridge information in that BDPU is superior to the root bridge information present in the link aggregation node device 402d, the spanning tree protocol may operate to designate the port identifier 402d-1 as a root port, as illustrated in FIG. 8b with the "R" provided for the port identifier 402d-1. Furthermore, the link aggregation node device 402d may then send BPDUs (through its ports) that include root bridge information, and the spanning tree protocol may operate to designate the port identifier 402d-2 as a designated port, as illustrated in FIG. 8b with the "D" provided for the port identifier 402d-2. Similarly, the link aggregation node device 402b may receive a BDPU from the link aggregation node device 402a via its port associated with the port identifier 402b-1, and because the root bridge information in that BDPU is superior to the root bridge information present in the link aggregation node device 402b, the spanning tree protocol may operate to designate the port identifier 402b-1 as a root port, as illustrated in FIG. 8c with the "R" provided for the port identifier 402b-1. Furthermore, the link aggregation node device 402*b* may then send BPDUs (through its ports) that include root bridge information, and the spanning tree protocol may operate to designate the port identifier 402*b*-2 as a designated port, as illustrated in FIG. 8*c* with the "D" provided for the port identifier 402*b*-2.

The link aggregation node device 402*c* may receive BDPUs from the link aggregation node devices 402*b* and 402*d* via its ports associated with the port identifiers 402*c*-1 and 402*c*-2, respectively. Because the root bridge information in the BDPU received from the link aggregation node device 402*d* is superior to the root bridge information present in the link aggregation node device 402*c*, the spanning tree protocol may operate to designate the port identifier 402*c*-1 as a root port, as illustrated in FIG. 7*d* with the "R" provided for the port identifier 402*c*-1. However, because the root bridge information in the BDPU received from the link aggregation node device 402*b* is not superior to the root bridge information received from the link aggregation node device 402*d*, the spanning tree protocol may operate to designate the port identifier 402*c*-2 as an alternate port, as illustrated in FIG. 8*d* with the "A" provided for the port identifier 402*c*-2.

Figure 8D:
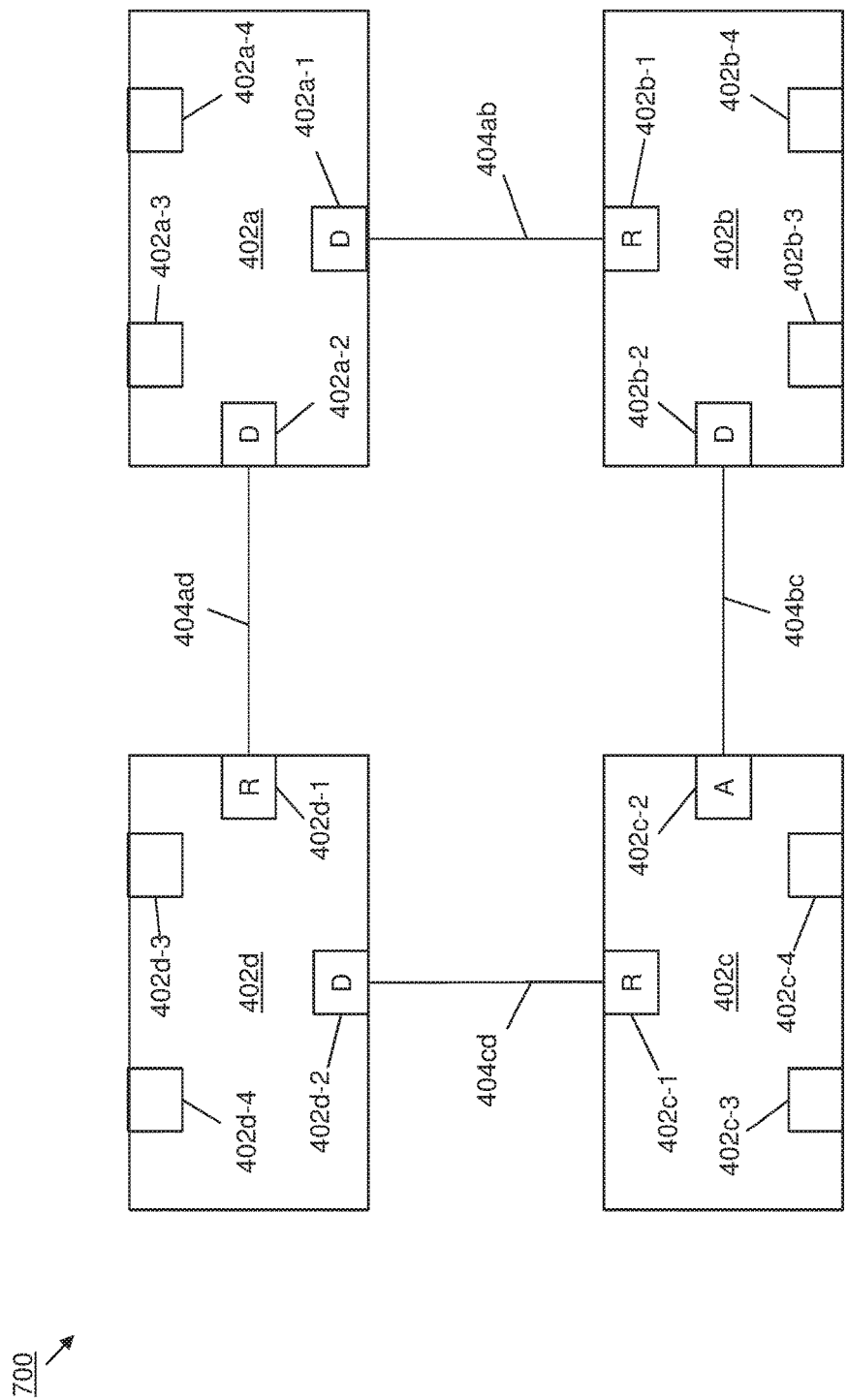
FIG. 8d is a schematic view illustrating an embodiment of the link aggregation fabric diagram of FIG. 7 with port assignments.

As such, in a specific example with reference to FIGS. 4 and 8*d*, at or prior to block 608 the spanning tree protocol provided in the spanning tree enabled n-node link aggregation system 400 may operate to designate an ICL port that is included on the link aggregation node device 402*c* and in the ICL 404*cd* (e.g., the port associated with the port identifier 402*c*-1) as a first root port due to, for example, that ICL port providing a desired link to the link aggregation node device 402*a* (which was designated as the root bridge at block 606.) However, one of skill in the art in possession of the present disclosure will recognize that the designation of the first root port by the spanning tree protocol may vary depending on which of the link aggregation node devices 402*a*-*d* is designated as the root bridge.

At block 608, the enhanced spanning tree protocol engine 506 may then operate to determine that the ICL port has been designated as the first root port by the spanning tree protocol. As discussed above, the enhanced spanning tree protocol engine 506 may operate on the devices in the spanning tree enabled n-node link aggregation system 400, in cooperation with or as part of the engine that provides the spanning tree protocol, and at block 608 may determine that the ICL port that is included on the link aggregation node device 402*c* and that is part of the ICL 404*cd* (e.g., the port associated with the port identifier 402*c*-1) was designated by the spanning tree protocol as the first root port. As such, a designation of the first root port may be communicated to the enhanced spanning tree protocol engine 506, determined as part of an engine operating to provide both the spanning tree protocol and the enhanced spanning tree protocol engine 506, and/or identified at decision block 608 in a variety of other manners that would be apparent to one of skill in the art in possession of the present disclosure.

The method 600 then proceeds to block 610 where the enhanced spanning tree protocol engine determines that another ICL port has been designated as an alternate port by the spanning tree protocol. As detailed above, at or prior to block 610, the spanning tree protocol provided in the spanning tree enabled n-node link aggregation system 400 may operate to designate another ICL port on another link aggregation node device as an alternate port. For example, a spanning tree protocol State Event Machine (SEM) may determine (e.g., via a state machine calculation) the state of the ICL port to be an alternate port. As would be understood by one of skill in the art in possession of the present disclosure, a port may be designated an alternate port by the spanning tree protocol SEM when that port is determined to provide a desired link (e.g., the "second best" link) to a root bridge. The details of the designation of an alternate port according to the spanning tree protocol are known in the art and will not be discussed herein in detail. In a specific example, with reference to FIGS. 4 and 8*d*, at or prior to block 610 the spanning tree protocol provided in the spanning tree enabled n-node link aggregation system 400 may operate to designate an ICL port that is included on the link aggregation node device 402*c* and that is part of the ICL 404*bc* (e.g., the port associated with the port identifier 402*c*-2) as an alternate port due to, for example, that ICL port providing a desired link to the link aggregation node device 402*a* (which was designated as the root bridge at block 606.) However, one of skill in the art in possession of the present disclosure will recognize that the designation of the alternate port by the spanning tree protocol may vary depending on which of the link aggregation node devices 402*a*-*d* is designated as the root bridge.

At block 610, the enhanced spanning tree protocol engine 506 may then operate to determine that another ICL port has been designated as an alternate port by the spanning tree protocol. As discussed above, the enhanced spanning tree protocol engine 506 may operate on any or all of the devices in the spanning tree enabled n-node link aggregation system 400, in cooperation with or as part of the engine that provides the spanning tree protocol, and at block 610 may determine that the ICL port that is included on the link aggregation node device 402*c* and that is part of the ICL 404*bc* (e.g., the port associated with the port identifier 402*c*-2) was designated by the spanning tree protocol as the alternate port. As such, a designation of the alternate port may be communicated to the enhanced spanning tree protocol engine 506, determined as part of an engine operating to provide both the spanning tree protocol and the enhanced spanning tree protocol engine, and/or identified at block 610 in a variety of other manners that would be apparent to one of skill in the art in possession of the present disclosure.

Figure 8E:
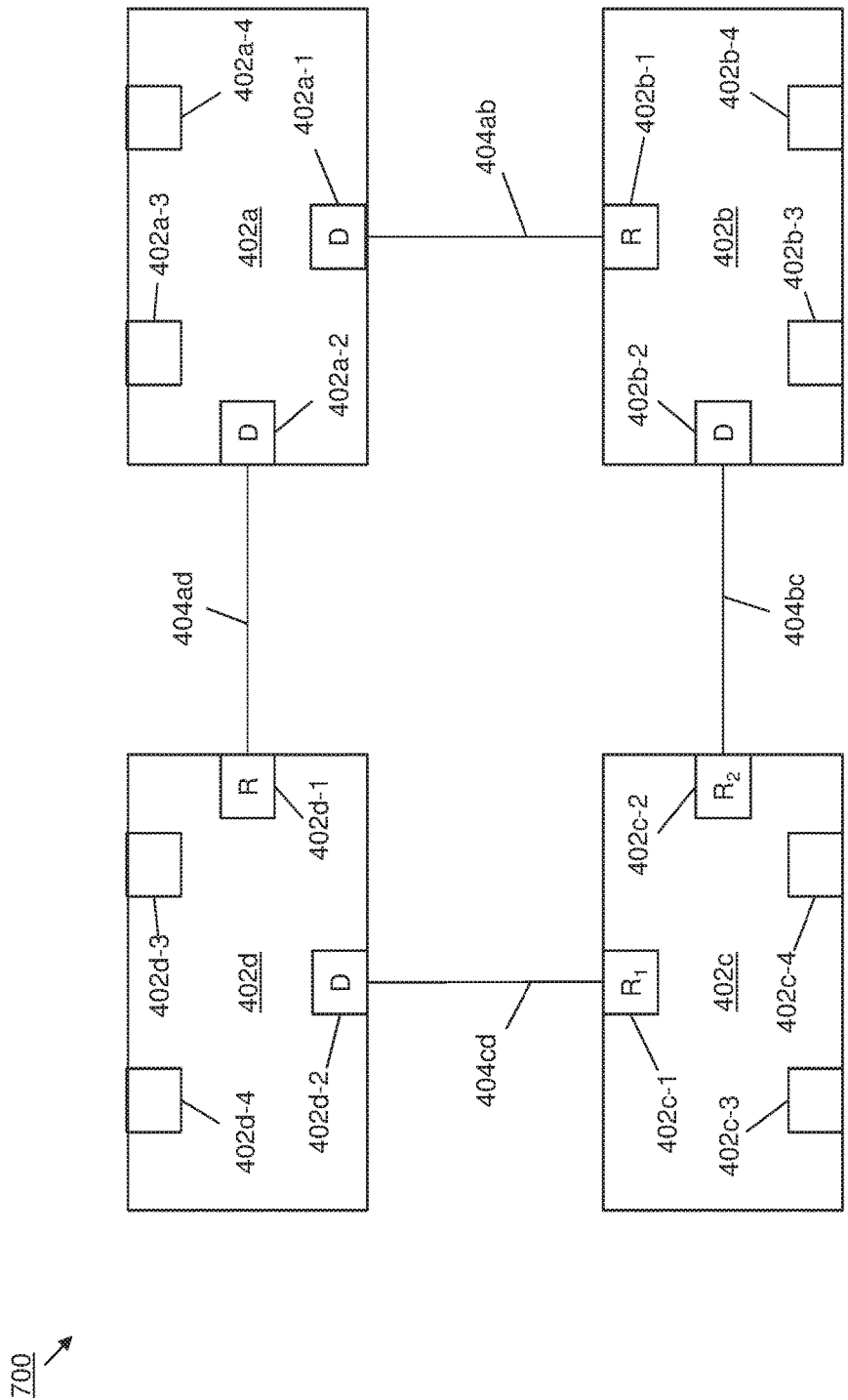
FIG. 8e is a schematic view illustrating an embodiment of the link aggregation fabric diagram of FIG. 7 with port assignments.

The method 600 then proceeds to block 612 where the enhanced spanning tree protocol engine redesignates the alternate port as a second root port. In an embodiment, at block 612, the enhanced spanning tree protocol engine 506 may operate to redesignate the ICL port that had been designated as an alternate port (by the spanning tree protocol) as a second root port. As discussed above, the enhanced spanning tree protocol engine 506 may operate on the devices in the spanning tree enabled n-node link aggregation system 400, in cooperation with or as part of the engine that provides the spanning tree protocol, and at block 610 may operate to redesignate the ICL port that is included on the link aggregation node device 402*c* and that is part the ICL 404*bc* (e.g., the port associated with the port identifier 402*c*-2 as a second root port. For example, with reference to FIGS. 8*d* and 8*e*, the port identifier 402*c*-2 may be redesignated from an alternate port (indicated by the "A" in FIG. 8*d*) to a second root port (indicated by the "$R_2$" in FIG. 8*e* to distinguish from the port identifier 402*c*-1 that is now designated "$R_1$" to indicate its status as the first root port). As would be understood by one of skill in the art in possession of the present disclosure, the redesignation of the ICL port from an alternate port to the second root port results in none of the ports that provide the ICLs 404*ab*, 404*bc*, 404*cd*, and 404*ad* being designated as an alternate port, which means none of those ports is in a blocking state as per the spanning tree protocol. As such, with the link aggregation fabric manager (e.g., the VLT fabric manager) preventing data loops in the link aggregation fabric (e.g., the VLT fabric), the spanning tree protocol is enabled in the link aggregation fabric without the blocking of any of the ICLs 404ab, 404bc, 404cd, and 404ad In some embodiments, the redesignation of an ICL port as a second root port may be referred to as a "derived state" of that ICL port, and distinguished from an "SEM state" of that ICL port that was designated by the spanning tree protocol (i.e., designated by the spanning tree SEM). As such, following block 612 in the example above, the ICL port that is included on the link aggregation node device 402c and that is part of the ICL 404bc (e.g., the port associated with the port identifier 402c-2) has an SEM state of "alternate port", and a derived state of "root port" (referred to as the "second root port" to distinguish it from the "first root port" discussed above.) As a result of the redesignation of the ICL port from an alternate port to the second root port at block 612, multiple root ports are provided for a link aggregation node device (e.g., a VLT node device) using the spanning tree protocol. Using the example provided above, the link aggregation node device 402c includes the port identifier 402c-1 as a first root port and the port identifier 402c-2 as a second root port.

As such, following block 612, it will be apparent to one of skill in the art in possession of the present disclosure that the link aggregation protocol (e.g., the VLT protocol) will operate to prevent loops that could otherwise be formed via the ICLs and between the link aggregation nodes 402a-d in the link aggregation fabric (e.g., the VLT fabric), while the spanning tree protocol may be utilized to prevent loops that extend outside of the link aggregation fabric without blocking any of the ICLs in the link aggregation fabric. Thus, the designation of multiple root ports on a VLT node device that are directed to another VLT node device that is designated a root bridge in a VLT fabric will allow the use of the spanning tree protocol with that VLT fabric without the blocking of any ICLs in the VLT fabric, thus enabling any n-node VLT system with a VLT node device as its root bridge to employ the spanning tree protocol to prevent loops that extend outside of the VLT fabric.

In some embodiments, a link aggregation node device connected to a LAG may be designated a primary link aggregation node device (e.g., a primary VLT node) or a secondary link aggregation node device (e.g., a secondary VLT node). For example, with reference to the LAG 408ab, the link aggregation node device 402a may be designated the primary link aggregation node device, and the link aggregation node device 402b may be designated the secondary link aggregation node device. In such embodiments, the spanning tree protocol and/or the enhanced spanning tree protocol engine 506 that operates on the primary link aggregation node device may control the port role/state for the LAG 408ab. Using the example provided above, the link aggregation node device 402a acting as the primary link aggregation node device may control whether ports that provide the LAG 408ab perform forwarding operations, blocking operations, and/or other port roles/states known in the art, and may propagate those port roles/states to the secondary link aggregation node device connected to the LAG 408ab. As such, the port role/state for LAG ports included in a LAG will remain consistent across all of the LAG ports on the link aggregation node devices that are connected to that LAG.

As discussed above, in addition to the functionality explicitly described above with regard to the method 600, a variety of other functionality may be performed (e.g., by the enhanced spanning tree protocol engine 506) in order to enable the use of the spanning tree protocol with an n-node link aggregation system. For example, topology changes (e.g., the addition and/or removal of a device from the network) in a networked system utilizing the spanning tree protocol can result in MAC address flushes in all of the nodes in the networked system in order to, for example, provide for the relearning of the new topology of the networked system. However, in the spanning tree enabled n-node link aggregation system 400, no learning is performed on the ICL ports that are part of the ICLs 404ab, 404bc, 404cd, and 404ad, and thus there is no need to invoke MAC address flushes on those ICL ports. As such, when the spanning tree protocol operating on the spanning tree enabled n-node link aggregation system 400 detects a topology change and sends out a topology change notification to the devices in the spanning tree enabled n-node link aggregation system 400, the enhanced spanning tree protocol engine 506 may operate on the link aggregation node devices 402a-d to ensure that MAC address flushing is not invoked on any of the ICL ports.

In another example of functionality related to topology changes in the spanning tree enabled n-node link aggregation system 400, when a topology change notification is forwarded on an ICL by a link aggregation node device, that topology change notification may be received back by that same link aggregation node device through another ICL, as ICLs are not blocked via the spanning tree protocol that is enhanced according to the teachings above. For example, with reference to FIG. 8e, the link aggregation node device 402b may detect a topology change in response to, for example, the port associated with the port identifier 402b-4 becoming unavailable (e.g., "going down") and then once again become available (e.g., "coming back up"). In response, the spanning tree protocol may operate to designate that the port identifier 402b-4 as a designated forwarding port, which will trigger a MAC address flush on the port associated with the port identifier 402b-3. Furthermore, in response to the topology change, the link aggregation node device 402b will send a topology change notification through the port associated with the port identifier 402b-1 (i.e., to the link aggregation node device 402a), the port associated with the port identifier 402b-2 (i.e., to the link aggregation node device 402c), and the port associated with the port identifier 402b-3.

In response to receiving the topology change notification, the link aggregation node device 402a may perform MAC address flushing (e.g., via the spanning tree protocol) on its non-ICL port(s) associated with the port identifiers 402a-3 and 402a-4 as discussed above, and forward the topology change notification through the port associated with the port identifier 402a-2 (i.e., to the link aggregation node device 402d), and the ports associated with the port identifiers 402a-3 and 402a-4. In response to receiving the topology change notification, the link aggregation node device 402d may perform MAC address flushing (e.g., via the spanning tree protocol) on its non-ICL port(s) associated with the port identifiers 402d-3 and 402d-4 as discussed above, and forward the topology change notification through the port associated with the port identifier 402d-2 (i.e., to the link aggregation node device 402c), and the ports associated with the port identifiers 402d-3 and 402d-4.

In response to receiving the topology change notification, the link aggregation node device 402c may perform MAC address flushing (e.g., via the spanning tree protocol) on its non-ICL port(s) associated with the port identifiers 402c-3 and 402c-4 as discussed above, and forward the topology change notification through the port associated with the port identifier 402*c*-2 (i.e., to the link aggregation node device 402*b*), and the ports associated with the port identifiers 402*c*-3 and 402*c*-4. As such, a topology change notification is forwarded back to the link aggregation node device 402*b* that triggered the topology change notification, which will result in the link aggregation node device 402*b* performing additional/repeated MAC address flushing (e.g., on its non-ICL port(s) associated with the port identifiers 402*b*-3 and 402*b*-4 as discussed above) even though it is the link aggregation node device that generated the topology change notification, and such additional/repeated MAC address flushing may also occur on the tree connected to those non-ICL port(s). However, if topology change notification are not sent via the ICLs (i.e., in order to prevent the loop described above that results in the additional/repeated MAC address flushing), the MAC address flushing of non-ICL ports will not be performed on the peer link aggregation node devices when a topology change in the system happens, which can lead to dropped traffic.

In order to address such topology change issues, the enhanced spanning tree protocol engine 506 may operate to store both the SEM state and the derived state for any ICL port, discussed above, and ensure that topology change notifications are not forwarded on ports with an SEM state of alternate. As such, the designation of a port as an alternate port by the spanning tree protocol (i.e., the SEM state) may be associated with that port (e.g., in the spanning tree protocol database 510), and the redesignation of that port by the enhanced spanning tree protocol engine 506 as a root port may be associated with that port (e.g., in the spanning tree protocol database 510), and that information may then be used to determine whether to forward topology change notifications Using the example discussed above with reference to FIG. 7*e*, the enhanced spanning tree protocol engine 506 may operate to block the transmission of the topology change notification on the port associated with the port identifier 402*c*-2 that has alternate port as its SEM state, thus preventing the sending of a topology change notification back to the link aggregation node device 402*b* that initiated that topology change notification, and preventing a data loop that would cause additional/repeated MAC address flushing as discussed above.

In another example of additional functionality that may be provided in the spanning tree enabled n-node link aggregation system 400, the enhanced spanning tree protocol engine 506 may operate to ensure that each of the LAGs is visible to the spanning tree protocol operating on the spanning tree enabled n-node link aggregation system 400 such that the spanning tree protocol is aware of those LAGs, which will allow a primary link aggregation node device (discussed above) to control the port role/state for that LAG. As such, even LAGs that have no members (and even no local port-channel) in a link aggregation node device will be visible to that link aggregation node device.

In yet another example of additional functionality that may be provided in the spanning tree enabled n-node link aggregation system 400, when a link aggregation node device does not include a local port-channel for a LAG, the enhanced spanning tree protocol engine 506 may operate to create a virtual port for that LAG. Following the creation of that virtual port, the enhanced spanning tree protocol engine 506 running on a link aggregation node device that is a primary link aggregation node device for a LAG (discussed above) will transmit and receive control messages (e.g., Bridge Protocol Data Units (BPDUs)) on the virtual port, and the link aggregation fabric will then operate to ensure that the control message is sent to the proper networking device (e.g., 406*a* or 406*b*). Furthermore, secondary link aggregation node devices that receive the control message via the LAG will tunnel the control message to the primary link aggregation node device.

In yet another example of additional functionality that may be provided in the spanning tree enabled n-node link aggregation system 400, in some situations a primary link aggregation node device for a LAG may not include a local port-channel for some LAGs in the spanning tree enabled n-node link aggregation system 400. In response to such a situation, the enhanced spanning tree protocol engine 506 may operate to generate a unique identifier (e.g., vlt-port-id) for each LAG in the link aggregation fabric, and provide the unique identifier(s) to each of the link aggregation node devices in the link aggregation fabric. The unique identifier(s) may then be used to generate corresponding spanning tree protocol unique port identifier(s), which will ensure that the spanning tree protocol port identifier(s) for the LAG(s) are unique across the link aggregation fabric.

Thus, systems and methods have been described that provide modifications and/or enhancements to the spanning tree protocol that operate to designate multiple root ports for a VLT node that is part of a VLT fabric with a VLT node designated as a root bridge. The provisioning of multiple root ports for a VLT node in a VLT fabric with a VLT node designated as a root bridge provides a spanning tree that converges well and prevents loops, while ensuring that ICLs between the VLT nodes are not blocked, and allowing a VLT fabric manager to control traffic in the VLT fabric. The use of the spanning tree protocol is further enabled in VLT fabrics via the prevention of Media Access Control (MAC) address flushing on ports that are part of an ICL, the blocking of the transmission of topology change notifications on ports that have been designated as alternate ports by the spanning tree protocol, the awareness of LAGs by the spanning tree protocol running on each of VLT nodes, the creation of virtual ports in VLT nodes for LAGs when that VLT node does not include a local port-channel for that LAG, and the use of those virtual ports to send control messages.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A spanning tree enabled n-node link aggregation system, comprising:
   a networking device;
   a plurality of link aggregation node devices, wherein a spanning tree protocol runs on each of the plurality of link aggregation node devices, and wherein the plurality of link aggregation node devices include:
   a first link aggregation node device that is coupled to the networking device by at least one first link that is part of a Link Aggregation Group (LAG), wherein the first link aggregation node device has been designated as a root bridge via the spanning tree protocol; and
   a second link aggregation node device that is coupled to the networking device by at least one second link that is part of the LAG;
   a plurality of Inter-Chassis Links (ICLs) coupled to the second link aggregation node device; and an enhanced spanning tree protocol engine running on the each of the plurality of link aggregation node devices, wherein the enhanced spanning tree protocol engine is configured to:
  determine that a first port that is part of one of the plurality of CLs has been designated as a first root port via the spanning tree protocol;
  determine that a second port that is part of one of the plurality of ICLs has been designated as an alternate port via the spanning tree protocol; and
  redesignate, in response to the first port being part of one of the plurality of ICLs and designated as the first root port and the second port being part of one of the plurality of ICLs and designated as the alternate port, the second port as a second root port, wherein the redesignating the second port as the second root port prevents blocking of the plurality of ICLs via the spanning tree protocol.

2. The system of claim 1, wherein the plurality of link aggregation node devices are part of a Virtual Link Trunking fabric.

3. The system of claim 1, wherein the enhanced spanning tree protocol engine is configured to:
  ensure that Media Access Control (MAC) address flushing is not invoked on any ports that are part of any of the plurality of ICLs.

4. The system of claim 1, wherein the enhanced spanning tree protocol engine is configured to:
  receive a topology change notification; and
  block, in response to the second port having been designated as the alternate port via the spanning tree protocol, transmission of the topology change notification on the ICL that includes the second port.

5. The system of claim 1, wherein the enhanced spanning tree protocol engine is configured to:
  ensure that the spanning tree protocol running on each of the plurality of link aggregation node devices is aware of the LAG.

6. The system of claim 1, wherein the enhanced spanning tree protocol engine is configured to:
  determine that at least one of the plurality of link aggregation node devices does not include a local port-channel for the LAG and, in response, create a virtual port in that link aggregation node device for the LAG.

7. The system of claim 6, wherein the enhanced spanning tree protocol engine is configured to:
  transmit a control message via the virtual port.

8. An Information Handling System (IHS), comprising:
  a plurality of Inter-Chassis Links (ICLs) that couple a plurality of ICL ports to a first of a plurality of link aggregation node devices that has been designated as a root bridge by via a spanning tree protocol running on each of the plurality of link aggregation node devices;
  a Link Aggregation Group (LAG) that includes a plurality of LAG ports and that is coupled to a networking device;
  a processing system that is coupled to the plurality of ICL ports and the plurality of LAG ports, and
  a memory system that is coupled to the processing system and that includes instructions that, when executed by the processing system, cause the processing system to provide an enhanced spanning tree protocol engine that is configured to:
    determine that a first ICL port of the plurality of ICL ports has been designated as a first root port via the spanning tree protocol;
    determine that a second ICL port of the plurality of ICL ports has been designated as an alternate port via the spanning tree protocol; and
    redesignate, in response to the first ICL port being designated as the first root port and the second ICL port being designated as the alternate port, the second port as a second root port, wherein the redesignating the second port as the second root port prevents blocking of the plurality of ICLs via the spanning tree protocol.

9. The IHS of claim 8, wherein the plurality of link aggregation node devices are part of a Virtual Link Trunking fabric.

10. The IHS of claim 8, wherein the enhanced spanning tree protocol engine is configured to:
  ensure that Media Access Control (MAC) address flushing is not invoked on any of the plurality of ICL ports.

11. The IHS of claim 8, wherein the enhanced spanning tree protocol engine is configured to:
  receive a topology change notification; and
  block, in response to the second port having been designated as the alternate port via the spanning tree protocol, transmission of the topology change notification on the ICL that includes the second port.

12. The IHS of claim 8, wherein the enhanced spanning tree protocol engine is configured to:
  ensure that the spanning tree protocol running on each of the plurality of link aggregation node devices is aware of the LAG.

13. The IHS of claim 8, wherein the enhanced spanning tree protocol engine is configured to:
  determine that at least one of the plurality of link aggregation node devices does not include a local port-channel for the LAG and, in response, create a virtual port in that link aggregation node device for the LAG; and
  transmit a control message via the virtual port.

14. A method for enabling a spanning tree protocol in an n-node link aggregation system, comprising:
  coupling, by a link aggregation engine, a plurality of ICL ports to a first of a plurality of link aggregation node devices via a plurality of Inter-Chassis Links (ICL);
  aggregating, by the link aggregation engine, at least one Link Aggregation Group (LAG) port to provide a LAG;
  designating, via a spanning tree protocol running on each of the plurality of link aggregation node devices, the first of the plurality of link aggregation node devices as a root bridge;
  determining, by an enhanced spanning tree protocol engine, that a first ICL port of the plurality of ICL ports has been designated as a first root port via the spanning tree protocol;
  determining, by the enhanced spanning tree protocol engine, that a second ICL port of the plurality of ICL ports has been designated as an alternate port via the spanning tree protocol; and
  redesignating, by the enhanced spanning tree protocol engine in response to the first ICL port being designated as the first root port and the second ICL port being designated as the alternate port, the second port as a second root port, wherein the redesignating the second port as the second root port prevents blocking of the plurality of ICLs via the spanning tree protocol.

15. The method of claim 14, wherein plurality of link aggregation node devices are part of a Virtual Link Trunking fabric.

16. The method of claim 14, further comprising:
ensuring, by the enhanced spanning tree protocol engine, that Media Access Control (MAC) address flushing is not invoked on any of the plurality of ICL ports.

17. The method of claim 14, further comprising:
receiving, by the enhanced spanning tree protocol engine, a topology change notification; and
blocking, by the enhanced spanning tree protocol engine in response to the second port having been designated as the alternate port via the spanning tree protocol, transmission or receipt of the topology change notification on the ICL that includes the second port.

18. The method of claim 14, further comprising:
ensuring, by the enhanced spanning tree protocol engine, that the spanning tree protocol running on each of the plurality of link aggregation node devices is aware of the LAG.

19. The method of claim 14, further comprising:
determining, by the enhanced spanning tree protocol engine, that at least one of the plurality of link aggregation node devices does not include a local port-channel for the LAG and, in response, creating a virtual port in that link aggregation node device for the LAG.

20. The method of claim 19, further comprising:
transmitting, by the enhanced spanning tree protocol engine, a control message via the virtual port.

* * * * *